United States Patent
Sherrets (10) Patent No.: US 7,844,238 B2
(45) Date of Patent: Nov. 30, 2010

(54) COMPENSATION FOR HOLES IN THE READ RANGE OF AN RFID READER TECHNICAL FIELD

(75) Inventor: David L. Sherrets, Erie, CO (US)

(73) Assignee: Assa Abloy AB, Stockholm (SE)

( * ) Notice: Subject to any disclaimer, the term of this patent is extended or adjusted under 35 U.S.C. 154(b) by 679 days.

(21) Appl. No.: 11/294,635

(22) Filed: Dec. 5, 2005

(65) Prior Publication Data

US 2007/0129039 A1    Jun. 7, 2007

(51) Int. Cl.
H04B 1/06    (2006.01)
H04B 7/00    (2006.01)
H04B 5/00    (2006.01)

(52) U.S. Cl. ............. 455/230; 455/41.1; 455/41.2
(58) Field of Classification Search ......... 455/230, 455/41.1, 41.2, 106–107, 231, 240.1, 245.1, 455/247.1, 334, 70, 73, 550.1; 340/10.1, 340/10.52, 572.1, 572.8, 573.4, 572.7, 572.5; 235/376, 487; 342/42, 44
See application file for complete search history.

(56) References Cited

U.S. PATENT DOCUMENTS

| 5,241,160 | A | | 8/1993 | Bashan et al. |
| 6,720,866 | B1 | * | 4/2004 | Sorrells et al. ............ 340/10.4 |
| 6,812,824 | B1 | | 11/2004 | Goldinger et al. |
| 7,019,617 | B2 | * | 3/2006 | Pratt et al. ................. 340/10.1 |
| 7,030,786 | B2 | * | 4/2006 | Kaplan et al. ................. 341/50 |
| 7,044,387 | B2 | * | 5/2006 | Becker et al. ............... 235/492 |
| 7,199,713 | B2 | * | 4/2007 | Barink et al. ............ 340/572.1 |
| 7,248,933 | B2 | * | 7/2007 | Wildman ..................... 700/90 |
| 7,265,675 | B1 | * | 9/2007 | Carrender et al. ........ 340/572.7 |
| 7,293,705 | B2 | * | 11/2007 | Linton et al. ................ 235/385 |
| 7,405,660 | B2 | * | 7/2008 | Diorio et al. ............ 340/572.4 |
| 7,411,921 | B2 | * | 8/2008 | Strong et al. ................ 370/328 |
| 7,469,127 | B2 | * | 12/2008 | Takiguchi .................. 455/41.1 |
| 2001/0034565 | A1 | | 10/2001 | Leatherman |
| 2005/0121518 | A1 | | 6/2005 | Steffen |
| 2008/0096517 | A1 | * | 4/2008 | Appleyard et al. .......... 455/403 |
| 2008/0146167 | A1 | * | 6/2008 | Rofougaran ................ 455/88 |
| 2008/0194200 | A1 | * | 8/2008 | Keen et al. ................ 455/41.1 |

FOREIGN PATENT DOCUMENTS

| EP | 0675459 A2 | 10/1995 |
| WO | WO-2004/004196 A1 | 1/2004 |

* cited by examiner

*Primary Examiner*—Pablo N Tran
(74) *Attorney, Agent, or Firm*—Sheridan Ross P.C.

(57) ABSTRACT

A reader and a corresponding method are provided for processing transponder data signals received from a transponder in an RFID system. The reader includes an exciter which generates excitation signals, a receiver which conditions the transponder data signals, an antenna coupled to the exciter and receiver which transmits the excitation signals and receives the transponder data signals, and a controller coupled to the receiver. The controller receives the conditioned transponder data signals and demodulates the conditioned signals to extract the transponder data. The controller is configured to detect the amplitude of the conditioned signals and to control operation of the receiver as a function of the amplitude of the conditioned signals.

11 Claims, 5 Drawing Sheets

COMPENSATION FOR HOLES IN THE READ RANGE OF AN RFID READER TECHNICAL FIELD

TECHNICAL FIELD

The present invention relates generally to RFID systems and, more particularly, to the construction and operation of a reader utilized within an RFID system.

BACKGROUND OF THE INVENTION

Radio frequency identification (RFID) systems typically include at least one host reader and a plurality of transponders, which are commonly termed credentials, cards, tags, or the like. The transponder may be an active or passive radio frequency communication device which is directly attached to or embedded in an article to be identified or otherwise characterized by the reader. Alternatively, the transponder may be embedded in a portable substrate, such as a card, tag, or the like, carried by a person or an article to be identified or otherwise characterized by the reader. A passive transponder is characterized as being dependent on the host reader for its power source. The host reader "excites" or powers up the passive transponder by transmitting excitation signals into the space surrounding the reader, which are received by the transponder and provide the operating power for the circuitry of the recipient transponder. In contrast, an active transponder is powered up by its own internal power source, such as a battery, which provides the operating power for the transponder circuitry.

Once the active or passive transponder is powered up, the transponder communicates information, such as identity data or other characterizing data stored in the memory of the transponder, to the reader and the reader can likewise communicate information back to the transponder without the reader and transponder coming into contact with one another. The transponder transmits transponder data signals in the form of electromagnetic waves via a transponder antenna into the surrounding space occupied by the reader. The reader receives the transponder data signals on a reader antenna and the reader contains its own circuitry to "read" the transponder data signals, i.e., extract the data from the transponder data signals. Reading a transponder data signal requires the reader circuitry to process a transponder data signal in a manner which typically comprises conditioning the transponder data signal by means including an amplifier. The resulting conditioned signal is then demodulated to extract the transponder data therefrom.

RFID systems are generally characterized by a number of parameters relating to transmission and processing of the data signals from either the transponder or the reader. Such parameters include the carrier frequency of the data signals, the transfer rate of the data in the data signals, and the type of modulation of the data signals. In particular, data signals communicated between the transponder and reader of a given RFID system are usually at a specified standard carrier frequency, which is characteristic of the given RFID system. For example, RFID systems, which employ transponders of the type conventionally termed proximity cards or proximity tags, typically communicate by means of data signals at a carrier frequency within a range of 100 to 150 kHz. This carrier frequency range is nominally referred to herein as 125 kHz carrier frequency and is deemed a low frequency. In contrast, RFID systems, which employ transponders of the type conventionally termed smart cards, typically communicate by means of data signals at a higher frequency of about 13.56 MHz.

The transfer rate of digital data communicated between the transponder and reader of a given RFID system via the data signals is commonly at one of a number of specified standard data rates, which is also characteristic of the given RFID system. The specified data rates are usually a function of the carrier frequency for the given RFID system. For example, RFID systems operating at the 125 kHz carrier frequency typically employ a relatively low data rate on the order of a few kilobits per second. For RFID systems operating at the 13.56 MHz carrier frequency, one particular industry standard specifies a low data rate of about 6 kilobits per second and a high data rate of about 26 kilobits per second. Another industry standard specifies an even higher data rate of 106 kilobits per second for RFID systems operating at the 13.56 MHz carrier frequency.

The type of modulation applied to data signals in a given RFID system is also characteristic of the given RFID system. Among the different modulation types available to RFID systems are frequency shift keying (FSK), phase shift keying (PSK) and amplitude shift keying (ASK).

Figure 1:
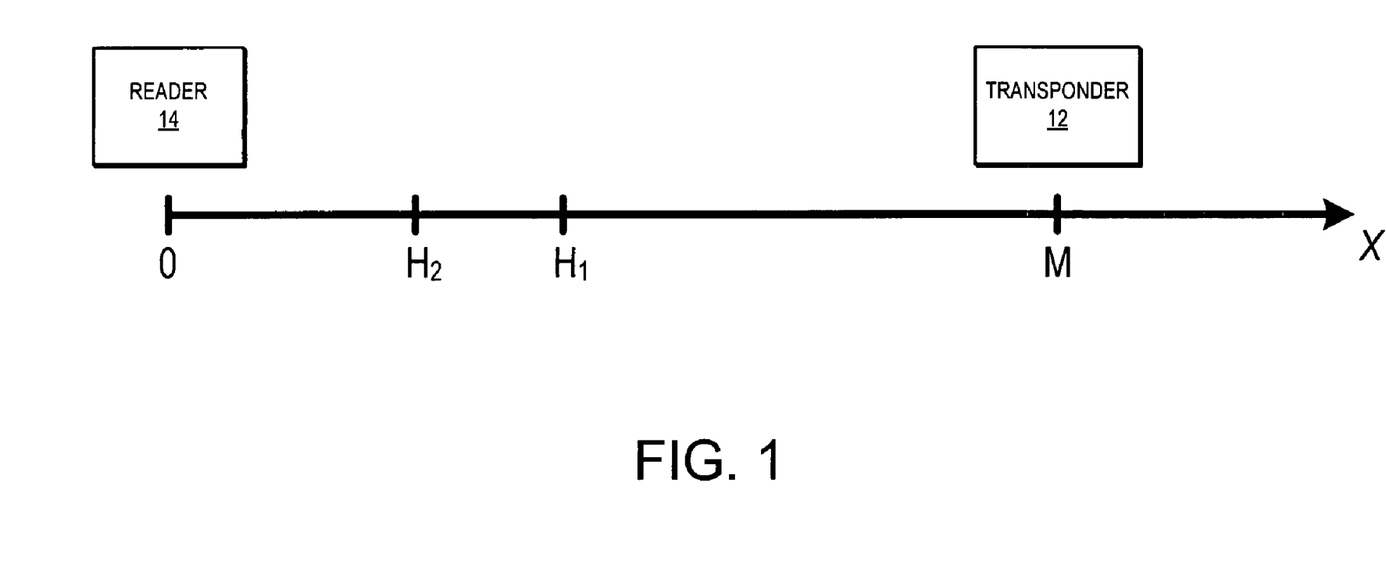
FIG. 1 is a diagrammatic view illustrating a generalized read range of a reader within an RFID system, wherein the reader is communicatively positioned relative to a transponder which is also included within the RFID system.

Referring to FIG. 1, a representative transponder and reader of an RFID system, which are designated 12 and 14, respectively, are shown positioned relative to one another along a linear x-axis representing distance. For purposes of illustration, the read range of a reader has been described above in the context of a one-dimensional linear model. However, in practice it is understood that the read range of a reader is a three-dimensional space to which the above-recited one-dimensional model is readily applicable. In any case, communication between the transponder 12 and reader 14 is only enabled when the transponder 12 and reader 14 are sufficiently close to one another that transponder data signals received by the reader 14 are of sufficient strength that the reader 14 is able to demodulate the transponder data signals and extract the data therefrom. When the reader 14 is fixed at a position x=0, the furthest point on the x-axis where the transponder 12 can be positioned while still enabling communication between the reader 14 and transponder 12 is designated x=M and is termed the read range maximum of the reader 14. As such, the entire read range of the reader 14 is designated $0 \leq x \leq M$.

It has been found that as the transponder 12 moves from the read range maximum M to points within the read range closer to the reader 14 designated $H_1 < x < M$, which are collectively termed the far read range segment, the amplitude of the transponder data signals received by the reader 14 generally increases, thereby causing the reader amplifier to begin clipping the received transponder data signal. Because different portions of the passband of the reader antenna have more gain than others, some frequencies of the received transponder data signal are clipped sooner than others. At some point within the far read range segment designated $x=H_1$ and termed the near end of the far read range segment, some, but not all, of the received transponder data signal is clipped by the reader amplifier to the extent that the reader 14 is unable to properly demodulate the conditioned transponder data signal from the reader amplifier because the reader amplifier has overly distorted the transponder data signal. Accordingly, when the transponder 12 reaches the near end of the far read range segment $H_1$, the reader 14 operating at its normal settings is unable to read the transponder data signal.

As the transponder 12 continues to approach the reader 14 from the near end of the far read range segment $H_1$, the reader amplifier clips even more of the received transponder data signal. Nevertheless, at some point designated $x=H_2$ and termed the far end of the near read range segment, the distortion of the transponder data signal diminishes to the extent that the reader 14 is again able to demodulate the conditioned output signal of the reader amplifier. Accordingly, the segment of the read range designated $H_2 \leq x \leq H_1$, wherein $H_1 < M$ and $H_2 > 0$, is termed a "hole" and is characterized as a segment of the read range closer to the reader 14 than the far read range segment where the reader 14 is unable to read the transponder data signal. The segment of the read range designated $0 \leq x < H_1$ is termed the near read range segment and is characterized as a segment of the read range separated from the far read range segment by a hole where the reader 14 is once again able to read the transponder data signal.

The present invention recognizes a need for a reader which is capable of reading received transponder data signals across essentially the entirety of the read range of the reader. Accordingly, it is an object of the present invention to enhance the signal reading capability of a reader when a transponder is positioned within a hole in the read range of the reader. More particularly, it is an object of the present invention to provide a reader which effectively compensates for holes in the read range of the reader. Still more particularly, it is an object of the present invention to provide a reader which is configured to selectively adjust the gain of the reader amplifier to compensate for holes in the read range of the reader. These objects and others are accomplished in accordance with the invention described hereafter.

SUMMARY OF THE INVENTION

The present invention is a reader for an RFID system. The reader comprises an antenna configured to receive a transponder data signal, a receiver coupled to the antenna for generating a conditioned output signal from the transponder data signal, and a controller coupled to the receiver for detecting amplitude of the conditioned output signal and controlling operation of the receiver as a function of the amplitude. The controller preferably further includes a capability for demodulating the conditioned output signal. The receiver preferably includes an amplifier. The controller may also include an input circuit coupled to the amplifier for detecting the amplitude of the conditioned output signal.

In accordance with one embodiment, the controller selectively reduces the amplitude of the conditioned output signal by adjusting voltage reduction performed by the high voltage reduction circuit when the controller detects the amplitude of the conditioned output signal greater than a predetermined threshold such that transponder data is not extractable from the conditioned output signal. In accordance with an alternate embodiment, the controller selectively reduces the amplitude of the conditioned output signal by adjusting a gain of the amplifier when the controller detects the amplitude of the conditioned output signal greater than a predetermined threshold such that transponder data is not extractable from the conditioned output signal.

The transponder data signal is preferably a low voltage signal and the antenna is further configured to receive a high voltage excitation signal, wherein the low voltage transponder data signal is superposed on the high voltage excitation signal to define an antenna signal. In accordance with one embodiment, the receiver comprises a high voltage reduction circuit coupled to the antenna for generating a voltage reduced signal from the antenna signal and an amplifier coupled to the high voltage reduction circuit for generating the conditioned output signal from the voltage reduced signal. When the antenna signal has a voltage value exceeding an upper voltage tolerance level of the amplifier, the high voltage reduction circuit conveys peak portions of the antenna signal to the amplifier to reduce the voltage value below the upper voltage tolerance level of the amplifier.

In another characterization of the present invention, the reader comprises an antenna configured to receive a transponder data signal, a receiver coupled to the antenna which includes a shift and clamp circuit for performing a shifting operation and a clamping operation on the transponder data signal, and a controller coupled to the receiver for demodulating a receiver output signal, thereby extracting transponder data from the receiver output signal. The controller is further provided for detecting amplitude of the conditioned output signal and controlling operation of the receiver in response to the amplitude. The receiver preferably includes an amplifier coupled to the shift and clamp circuit for receiving a shifted and clamped signal generated by the shift and clamp circuit from the transponder data signal, wherein the receiver output signal is a conditioned output signal generated by the amplifier from the shifted and clamped signal. The receiver preferably further comprises a switched capacitor filter (SWCAP) enabling switching between at least two modulation types selected from the group consisting of frequency shift keying (FSK) modulation, phase shift keying (PSK) modulation and amplitude shift keying (ASK) modulation.

In accordance with one embodiment, the controller selectively reduces the amplitude of the conditioned output signal by adjusting a level of the shifting operation performed by the shift and clamp circuit when the controller detects the amplitude of the conditioned output signal greater than a predetermined threshold such that transponder data is not extractable from the conditioned output signal. In accordance with an alternate embodiment, the controller selectively reduces the amplitude of the conditioned output signal by adjusting a gain of the amplifier when the controller detects the amplitude of the conditioned output signal greater than a predetermined threshold such that transponder data is not extractable from the conditioned output signal.

In another characterization of the present invention, the reader comprises an antenna to receive a transponder data signal and a receiver coupled to the antenna, wherein the receiver includes a voltage reduction circuit for receiving an antenna signal including the transponder data signal from the antenna and generating a voltage reduced signal. The voltage reduction circuit is preferably a shift and clamp circuit for isolating a portion of the antenna signal. The receiver further includes an amplifier coupled to the voltage reduction circuit for receiving the voltage reduced signal and generating a conditioned amplifier output signal. The reader further comprises a controller coupled to the amplifier for demodulating the conditioned amplifier output signal, thereby reading the transponder data signal. The controller is further provided for detecting the amplitude of the conditioned amplifier output signal and controlling operation of the receiver as a function of the amplitude. In particular, the controller preferably controls amplitude of a shift current applied to the shift and clamp circuit.

The reader may still further comprise an automatic gain control circuit coupled to the amplifier for adjusting a gain of the amplifier as a function of the amplitude. Alternatively, the automatic gain control circuit is coupled to the voltage reduction circuit for adjusting amplitude of the voltage reduced signal as a function of the amplitude of the conditioned amplifier output signal.

In accordance with one embodiment, the controller selectively reduces a gain of the amplifier when the controller detects the amplitude of the conditioned output signal greater than a predetermined threshold such that transponder data is not extractable from the conditioned output signal. In accordance with an alternate embodiment, the controller selectively reduces an amplitude of voltage reduced signal by adjusting an amount of voltage reduction performed by the voltage reduction circuit when the controller detects the amplitude of the conditioned output signal greater than a predetermined threshold such that transponder data is not extractable from the conditioned output signal.

The present invention is alternately a method for reading a transponder data signal. The method comprises receiving a transponder data signal containing transponder data on a reader antenna and amplifying the transponder data signal to generate a conditioned amplifier output signal containing the transponder data. An attempt is made to extract the transponder data from the conditioned amplifier output signal. If the attempt fails, an amplitude of the conditioned amplifier output signal is detected. The amplitude is compared to a predetermined threshold. If the amplitude is greater than the predetermined threshold such that the transponder data is not extractable from the conditioned amplifier output signal, a level of gain performed during amplification of the transponder data signal is adjusted. Adjusting the level of gain preferably comprises reducing gain performed by an amplifier. The conditioned amplifier output signal is then demodulated to extract the transponder data from the conditioned amplifier output signal, thereby reading the transponder data signal.

The transponder data signal is preferably a low voltage signal and the method further comprises receiving a high voltage excitation signal on the antenna, wherein the low voltage transponder data signal is superposed on the high voltage excitation signal to define an antenna signal. The method preferably further comprises reducing voltage of the antenna signal before amplifying the transponder data signal.

In another characterization of the present invention, the method for reading a transponder data signal comprises receiving an antenna signal on a reader antenna, wherein the antenna signal includes a low voltage transponder data signal containing transponder data. The voltage of the antenna signal is reduced to generate a voltage reduced signal containing the transponder data. The voltage reduced signal is amplified to generate a conditioned amplifier output signal containing the transponder data. An attempt is made to extract the transponder data from the conditioned amplifier output signal. If the attempt fails, an amplitude of the conditioned amplifier output signal is detected. The amplitude is compared to a predetermined threshold and a level of voltage reduction of the antenna signal is adjusted if the amplitude is greater than the predetermined threshold such that transponder data is not extractable from the conditioned amplifier output signal. Adjusting the level of voltage reduction preferably comprises adjusting a level of a shifting operation performed on the antenna signal by a shift and clamp circuit. The conditioned amplifier output signal is then demodulated to extract transponder data from the conditioned amplifier output signal, thereby reading the transponder data signal.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

Embodiments of the invention are illustrated by way of example and not by way of limitation in the above-recited figures of the drawings in which like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

Figure 2:
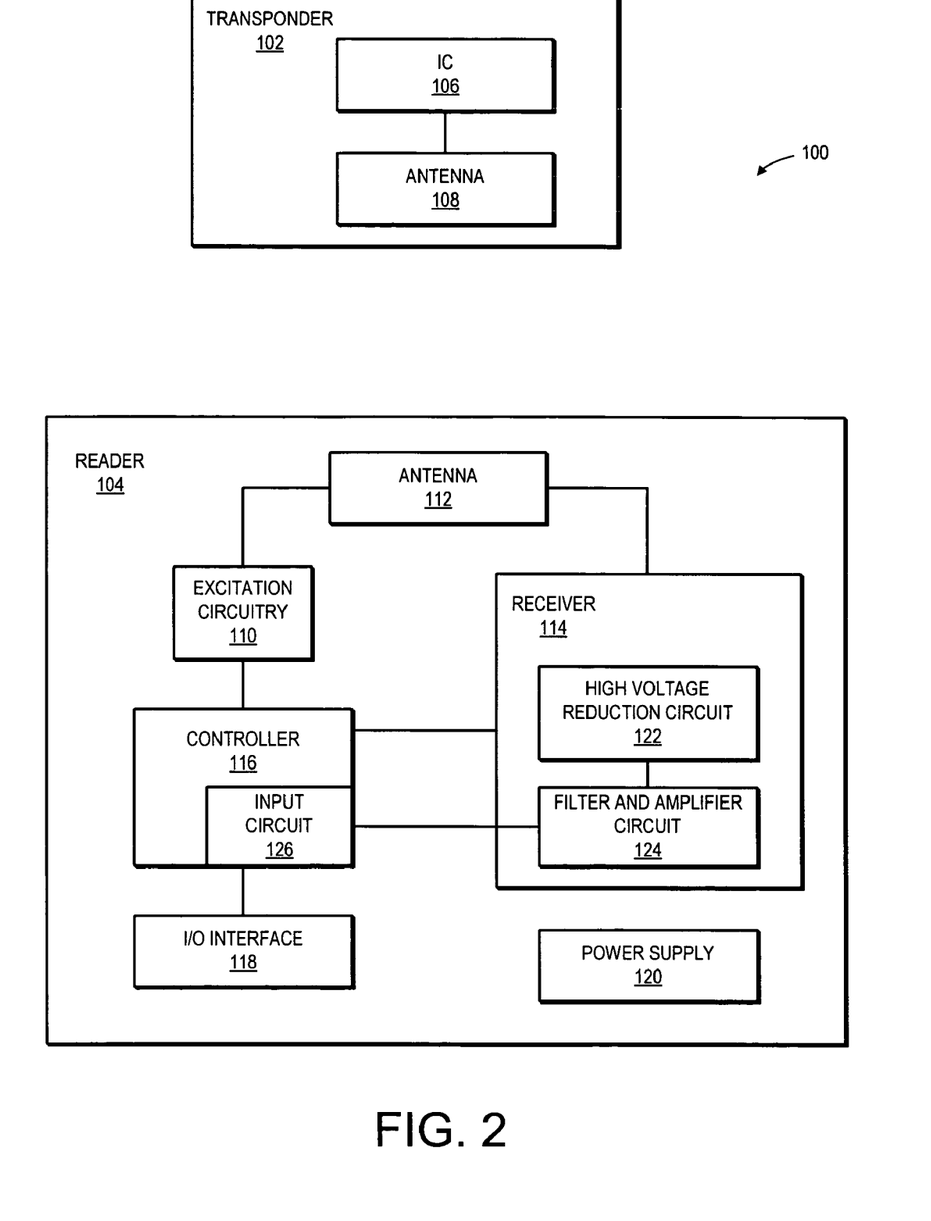
FIG. 2 is a block diagram of an RFID system including a transponder and an embodiment of a reader of the present invention.

An RFID system is shown in FIG. 2 and generally designated 100. The RFID system 100 comprises a transponder 102 and a reader 104 of the present invention. The transponder 102 is preferably a passive device which does not require power supplied from an internal power source. The electrical power required to operate a passive transponder is supplied to the transponder by electromagnetic energy transmitted from a reader. Accordingly, a passive transponder is operational when it receives electromagnetic waves from a reader, which are of a specific frequency and of a sufficient strength to power up the transponder.

The transponder 102 comprises a number of functional elements including a transponder integrated circuit (IC) 106 and a transponder antenna 108. The transponder IC 106 embodies the processing and memory capabilities of the transponder 102. The transponder antenna 108 is coupled to the transponder IC 106 and is a conventional coil termed a "dual-function antenna coil" which performs both the receiving and transmitting functions of the transponder 102. Alternatively, two separate receiving and transmitting antenna coils (not shown) can be substituted for the single "dual function antenna coil" in the transponder 102. The transponder 102 also optionally includes an external transponder tuning capacitor (not shown) coupled to the transponder IC 106 and to each antenna coil of the transponder antenna 18. The term "external" is used above with respect to the transponder 102 to designate electronic components which are not physically or functionally included within the transponder IC 106. The transponder antenna 108, in cooperation with the transponder tuning capacitor, if present, determines the carrier frequency of the transponder 102.

The transponder 102 shown and described herein is but one example of a type of transponder having utility in the RFID system 100. It is understood that practice of the present invention is not limited to any one specific type of transponder, but is generally applicable to most conventional types of transponders having utility in RFID systems. Thus, for example, the transponder can be selected from proximity cards, proximity tags, smart cards, or the like. It is further understood that practice of the present invention is not limited to RFID systems having only one transponder and one reader as shown and described, but is generally applicable to RFID systems having any number of compatible transponders and readers.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of both the transponder and reader. In the case of a portable reader and a portable transponder, the user may move both the portable reader and the portable transponder into relative proximity with one another to enable simultaneous operation of both the transponder and reader. Embodiments of the present invention are not limited to any one of the above-recited RFID system configurations.

The reader 104 of the present invention comprises a number of functional elements including excitation circuitry 110, a reader antenna 112, a receiver 114, a controller 116, an input/output (I/O) interface 118, and a power supply 120. The excitation circuitry 110 generally functions to generate an excitation signal which the reader antenna 112 transmits in the form of electromagnetic waves into the open space of the external environment surrounding the reader 104. The excitation signals are received by the transponder 102 to electrically power up the transponder 102. In a preferred embodiment, the excitation signal is a high voltage signal having a relatively high voltage, for example, within a range of about 75 to 125 volts zero to peak. Although not shown, the reader 104 optionally includes a tuning capacitor coupled to the reader antenna 112. The power supply 120 provides electrical operating power to the reader components in a controlled manner. In accordance with one embodiment, the power supply 120 is coupled to a finite electrical power source which is self-contained (i.e., internal) within the reader 104, such as a relatively small portable battery consisting of one or more disposable dry cells or rechargeable cells. Alternatively, the power supply 120 is hard wired to an essentially infinite remote electrical power source, such as an electric utility.

When the transponder 102 and/or the reader 104 is moved to a proximal position such that the distance between the transponder 102 and reader 104 is within the excitation signal reception range of the transponder 102, the transponder 102 receives the excitation signal on the transponder antenna 108, which powers up the transponder IC 106. Upon activation, the transponder IC 106 generates a transponder data signal, which contains readable information, i.e., transponder data, copied or otherwise derived from the memory of the transponder IC 106. The transponder data signal is transmitted into the open space of the external environment surrounding the transponder 102 via the transponder antenna 112. In preferred embodiment, the transponder data signal is a low voltage signal having a relatively low voltage, for example, within a range of about 1 to 100 millivolts (at the reader antenna 112).

The reader antenna 112 is a "dual-function antenna coil" which performs both the receiving and transmitting functions of the reader 104. In particular, the reader antenna 112 receives the transponder data signal from the external environment and transmits the excitation signal into the external environment. Accordingly, the excitation signal generated by the excitation circuitry 110 and the transponder data signal transmitted by the transponder 102 may both be on the reader antenna 112 at the same time with the low voltage transponder data signal superposed on the high voltage excitation signal. Although not shown, the reader 104 of the present invention alternately encompasses constructions having two separate receiving and transmitting antenna coils, respectively, which separately perform the receiving and transmitting functions of the reader 104. The receiver 114 is coupled to the reader antenna 112 to perform various operations which condition a high voltage antenna signal obtained at the reader antenna 112. The term "high voltage antenna signal" is used herein to describe a low voltage transponder data signal superposed on a high voltage excitation signal.

The receiver 114 comprises a number of functional elements including a high voltage reduction circuit 122 coupled to a filter and amplifier circuit 124. The high voltage reduction circuit 122 is configured to perform voltage reduction on the high voltage antenna signal received from the reader antenna 112 when the voltage of the high voltage antenna signal exceeds an upper voltage tolerance level of the filter and amplifier circuit 124. The high voltage reduction circuit 122 effects voltage reduction by only passing peak portions of the high voltage antenna signal to the filter and amplifier circuit 124 so that the amplitude of the voltage reduced signal is below the upper voltage tolerance level of the filter and amplifier circuit 124. The high voltage reduction circuit 122 is a either a passive circuit, which does not require power supplied from an external power source, or is alternatively an active circuit, which requires power supplied from an external power source.

The signal output by the high voltage reduction circuit 122 is an analog signal termed the voltage reduced signal. The voltage reduced signal is passed through the filter and amplifier circuit 124 to generate a conditioned amplifier output signal which is likewise an analog signal. The controller 116 is coupled to the filter and amplifier circuit 124 and samples the conditioned amplifier output signal containing the readable data from the transponder data signal. The sampling process results in a digitized version of the conditioned amplifier output signal termed the digital output signal, which the controller 116 processes to extract the readable transponder data contained therein. In particular, the controller 116 demodulates the digital output signal in accordance with a respective modulation type by executing specific firmware and/or software in the controller 116. The extracted transponder data may be sent to an external device, such as a central host computer (not shown), via the I/O interface 118.

In accordance with the teaching of the present invention, the controller 116 includes a functionality which detects the peak amplitude of the conditioned amplifier output signal from the filter and amplifier circuit 124 to determine if portions of the received transponder data signal are being clipped during the amplification process. This functionality is performed by an input circuit 126 integral with the controller 116, which detects the amplitude of the conditioned amplifier output signal from the filter and amplifier circuit 124. The input circuit 126 is preferably an analog to digital converter (ADC), comparator, or similar such circuit. When the amplitude of the conditioned amplifier output signal exceeds a predetermined upper voltage threshold, this is indicative that portions of the transponder data signal passed through the filter and amplifier circuit 124 are being clipped therein. It is noted that the predetermined threshold voltage can be adjusted as desired to accommodate different operating conditions.

Once an amplitude of the conditioned amplifier output signal is detected which exceeds the predetermined upper voltage threshold, the controller 116 determines if the signal can be properly demodulated to read the transponder data signal. The controller 116 is preferably configured, for example, to employ frequency shift keying (FSK) modulation at a carrier frequency of 125 kHz. However, other carrier frequencies and modulation types, including phase shift keying (PSK) and amplitude shift keying (ASK) can alternatively be used within the scope of the present invention.

If the controller 116 determines that the amplifier output signal cannot be properly demodulated to read the transponder data signal, the controller 116 adjusts the gain of the filter and amplifier circuit 124 to reduce the amplitude of the conditioned amplifier output signal from the filter and amplifier circuit 124 so that clipping of the signal is reduced. An automatic gain control (AGC) circuit (not shown) may also be included in the receiver 114 and coupled to the filter and amplifier circuit 124 to continually adjust the gain of the amplifier in the filter and amplifier circuit 124 based on the amplitude of the conditioned amplifier output signal. On the other hand, if software executed by the controller 116 determines that the transponder 102 is sufficiently close (i.e., within the near read range segment) to read transponder data signals even with clipping, the gain of the amplifier is set to its normal operating value. Thus, depending on the location of the transponder 102 with respect to the reader 104, the controller 116 is capable of making automatic adjustments to the operating parameters of the receiver 114 which reduce or eliminate "holes" in the read range of the reader 104 without affecting the read range maximum. The above-recited process for determining when a transponder 102 is positioned in a hole within the read range and for selectively controlling the receiver 114 in response thereto is described in detail below with reference to FIG. 3.

Figure 3:
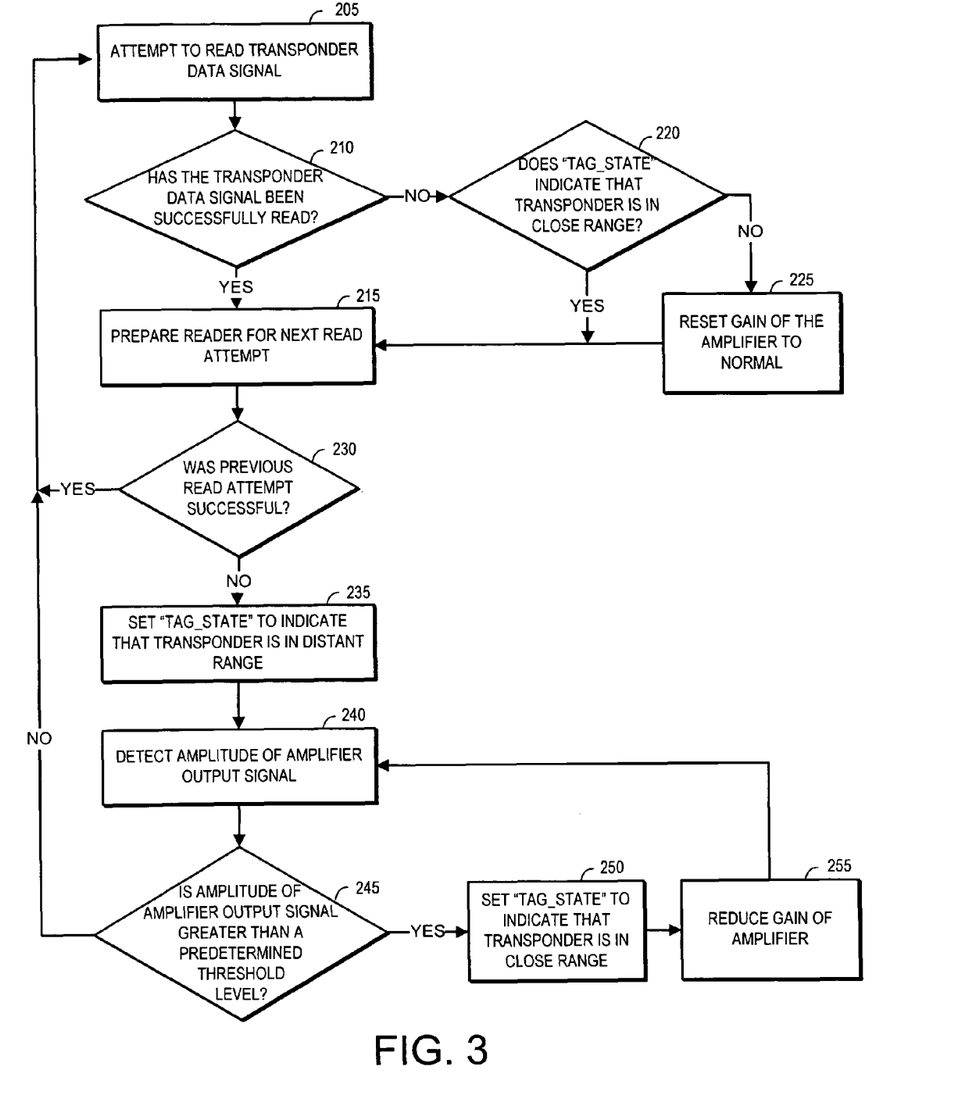
FIG. 3 is a flowchart illustrating operation of the reader of FIG. 2.

Referring to FIGS. 2 and 3, a process of the present invention is shown and described for operating the reader 104. Preliminary to the process, the reader antenna 112 receives a transponder data signal and conveys the transponder data signal to the receiver 114, which performs various operations to condition the transponder data signal and produce a conditioned amplifier output signal which contains the data from the transponder data signal. Block 205 shows the first step of the present process, wherein the controller 116 receives the conditioned amplifier output signal and attempts to read the transponder data signal (i.e., extract the data from the conditioned amplifier output signal). If the controller 116 successfully reads the transponder data signal (block 210, yes), the process proceeds to block 215 where the controller 116 prepares the reader 104 for the next successive read attempt.

If the controller 116 fails to read the transponder data signal (block 210, no), the process proceeds to block 220 where the controller 116 determines if a "tag_state" indicates that the transponder 102 is in close range to the reader 104. If the controller 116 does not determine a "tag_state" indicating that the transponder 102 is in close range (block 220, no), the process proceeds to block 225 where the controller 116 resets the gain of the amplifier in the filter and amplifier circuit 124 to normal. If the controller 116 determines a "tag_state" indicating that the transponder 102 is in close range, the process proceeds to block 215 where the controller 116 prepares the reader 104 for the next successive read attempt. The process then proceeds to block 230 where the controller 116 determines whether the previous read attempt was successful. If the previous read attempt was successful (block 230, yes), the process returns to block 205 where the controller 116 attempts to read the next transponder data signal. If the previous read attempt was unsuccessful (block 230, no), the process proceeds to block 235 where the "tag_state" is set to indicate that the transponder 102 is in a distant range. The process then proceeds to block 240 where the controller 116 detects the amplitude of the conditioned amplifier output signal from the filter and amplifier circuit 124 by means of the input circuit 126 within the controller 116.

If the amplitude of the conditioned amplifier output signal is greater than a predetermined upper voltage threshold (block 245, yes), the controller 116 assumes the transponder 102 is positioned in a hole and the process proceeds in a loop (blocks 240-255) to reduce the gain of the amplifier in the filter and amplifier circuit 124 until the amplitude of the conditioned amplifier output signal is below the predetermined upper voltage threshold. More specifically, the controller sets the "tag_state" to indicate that the transponder is in close range in block 250. The controller 116 then reduces the gain of the amplifier in block 255 and returns to block 240 where the amplitude of the conditioned amplifier output signal is measured again. If the amplitude of the conditioned amplifier output signal is still greater than the predetermined upper voltage threshold after the initial amplifier gain adjustment, the process repeats the loop (blocks 240-255) to further reduce the amplifier gain until a desired voltage level of the signal is achieved. When the amplitude of the conditioned amplifier output signal is less than the predetermined upper voltage threshold (block 245, no), the process returns to block 205 where the controller 116 attempts to read a newly received transponder data signal.

Figure 4:
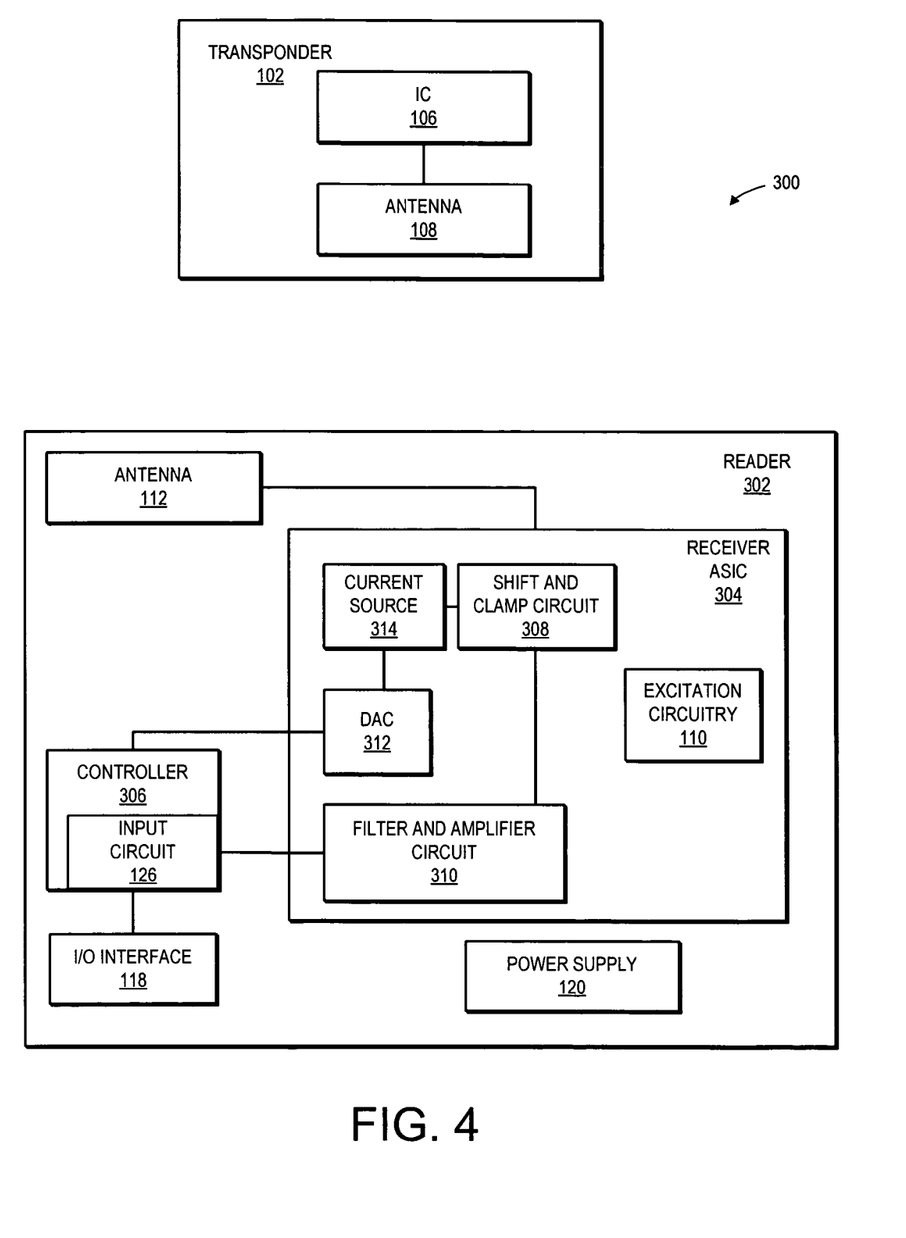
FIG. 4 is a block diagram of an RFID system including a transponder and an alternate embodiment of a reader of the present invention.

Referring to FIG. 4, an alternate RFID system 300 is shown and described wherein elements of the RFID system 300 which are identical to elements of the RFID system 100 shown in FIG. 2 are designated by the same reference numerals. As such, the RFID system 300 comprises the transponder 102 and an alternate reader 302. The reader 302 includes a receiver 304 coupled between the reader antenna 112 and a controller 306. The receiver 304 comprises a number of functional elements including the excitation circuitry 124, a shift and clamp circuit 308, a filter and amplifier circuit 310, a digital to analog converter (DAC) 312 and a current source 314. In a preferred embodiment, all the above-recited functional elements of the receiver 304 are included within an application specific integrated circuit (ASIC) which is preferably an active circuit powered by the internal power supply 120 of the reader 302 and/or an external power supply.

A preferred function of the shift and clamp circuit 308 is to isolate the transponder data signal from the excitation signal. The shift and clamp circuit 308 may be constructed in accordance with any number of techniques well known to the skilled artisan. One exemplary shift and clamp circuit 308 having utility herein is disclosed in U.S. Patent Publication No. 2005/0121518, which is incorporated herein by reference.

When a signal is present at the reader antenna 112, the signal is preferably processed by the shift and clamp circuit 308 to isolate a desired portion of the signal waveform to be read by the controller 306. In particular, the shifting portion of the shift and clamp circuit 308 specifies a desired location on the waveform where the waveform portion is to be isolated and the clamping portion of the shift and clamp circuit 308 specifies the size of the waveform portion to be isolated at the desired location on the waveform. Alternatively, the shift portion specifies a desired relative voltage value on the waveform and the clamping portion specifies a desired absolute voltage range which is applied to the waveform at the desired relative voltage value.

The signal at the reader antenna 112 is typically a high voltage antenna signal which comprises a low voltage transponder data signal superposed on a high voltage excitation signal. The high voltage antenna signal may have a voltage exceeding the upper voltage tolerance levels of some of the functional elements of the receiver 304. Shifting is performed on the high voltage antenna signal by applying a shift current to the shift and clamp circuit 308 from a current source 314, which may be a current source separate from the electrical power supply 120 of the reader 314 as shown. Although not shown, the current source 314 may alternatively be omitted so that the electrical power supply 120 functions as the current source for the shift and clamp circuit 308. In any case, the current source generates a shift current in accordance with any number of well know techniques within the purview of the skilled artisan. Alternatively, a shift voltage may be applied using a shift voltage source and resistor (not shown) to achieve substantially the same result as the shift current from the current source. In any case, the value of the applied shift current or the shift voltage is selected to correspond with a location (i.e., voltage value) on the waveform where it is desired to apply the voltage range specified by the clamping operation. As is apparent, the practitioner can apply the specified voltage range to substantially any location on the waveform simply by varying the shift voltage or shift current.

The shift and clamp circuit output signal is passed through the filter and amplifier circuit 310 to generate a conditioned amplifier output signal. A switched capacitor (SWCAP) filter may be used as a baseband filter in the filter and amplifier circuit 310, which allows selectively changing of the filter to accommodate frequency shift keying (FSK), phase shift keying (PSK), or amplitude shift keying (ASK) modulation. The conditioned amplifier output signal contains data from the transponder data signal and is received by the controller 306, which demodulates the signal to extract the data contained therein. The controller 306 includes the input circuit 126 which is used to detect the amplitude of the conditioned amplifier output signal.

The reader controller 306 preferably controls operation of the shift and clamp circuit 308 by adjusting the amplitude of the shift current applied thereto. The controller 306 preferably uses a digital to analog converter (DAC) 312 coupled between the controller 306 and current source 314 to selectively control the amplitude of the shift current applied to the shift and clamp circuit 308 by the current source 314. If an adjustment to the shift and clamp circuit 308 is desired, the controller 306 generates a digital control signal which is conveyed to the DAC 312. The DAC 312 generates an analog control signal in response to the control signal which is conveyed to the current source 314, causing the current source 314 to generate a shift current of an appropriate level as requested by the controller 306. The shift current applied to the shift and clamp circuit 308 is preferably generated in correspondence with a level required to attenuate the high voltage antenna signal with sufficient amplitude to reduce the amount of clipping occurring when the transponder data signal is passed through the filter and amplifier circuit 310.

The high voltage antenna signal can be selectively shifted a desired amount by applying an appropriate shift current to the shift and clamp circuit 308 using the current source 314. If the controller 306 determines that the output of the filter and amplifier circuit 310 is near its maximum drive capability and/or is near saturation and the transponder data from the conditioned amplifier output signal cannot be demodulated, the shift current applied to the shift and clamp circuit 308 is adjusted until the amplitude of the conditioned amplifier output signal from the filter and amplifier circuit 310 reaches an acceptable level. By doing so, the amplitude of the high voltage antenna signal is reduced to a proper level before the transponder data signal reaches the filter and amplifier circuit 310 and no adjustment to the gain of the amplifier is necessary.

If the transponder 102 is located in relatively close range with respect to the reader 302 (e.g., in the near read range segment shown in FIG. 1), portions of the transponder data signal passing through the filter and amplifier circuit 310 may be clipped, but the conditioned amplifier output signal can still be properly demodulated to read the transponder data signal. In this case the controller 306 does not need to adjust the shift and clamp circuit 308. Accordingly, the controller 306 is configured to reduce the amplitude of the signal input to the filter and amplifier circuit 310 only if the controller 306 senses that the conditioned amplifier output signal from the filter and amplifier circuit 310 is near its peak and the signal cannot be demodulated. By doing so, the response time of the reader 302 is increased, allowing the reader 302 to extract data from the transponder data signal more rapidly.

An automatic gain control (AGC) circuit (not shown) can alternatively be coupled to the shift and the clamp circuit 308 and filter and amplifier circuit 310 to continually adjust the level of the transponder data signal input to the filter and amplifier circuit 310 based on the amplitude of the conditioned amplifier output signal from the filter and amplifier circuit 310. The AGC circuit performs this function by adjusting the shifting current applied to the shift and clamp circuit 308. The shift and clamp circuit 308 and AGC circuit, if present, essentially function as a high voltage reduction circuit.

Figure 5:
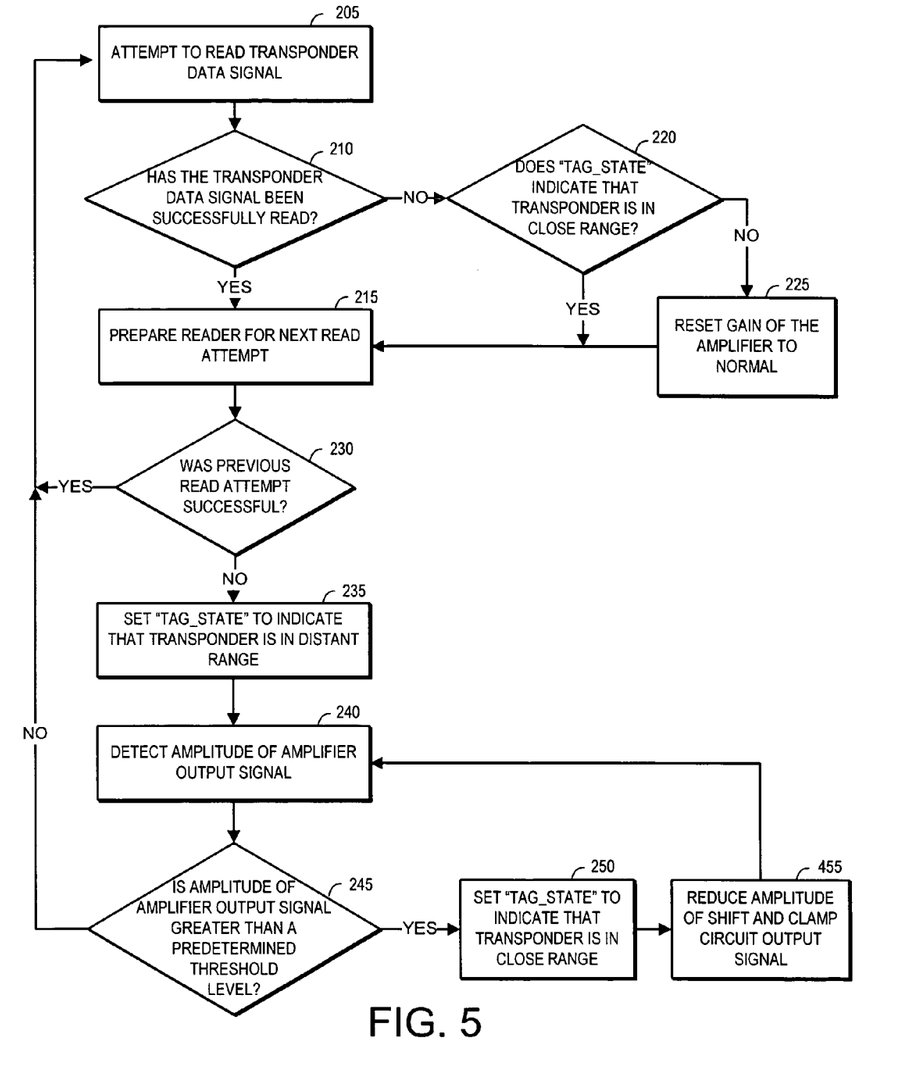
FIG. 5 is a flowchart illustrating operation of the reader of FIG. 4.

Referring to FIGS. 4 and 5, a process is shown and described for operating the reader 302 of the present invention. The functional blocks 205-250 shown in FIG. 5 are essentially identical to the functional blocks 205-250 shown in FIG. 3 and are designated by the same reference numerals. As such, if the controller 306 is unable to read the transponder data signal and the controller 306 determines that the conditioned amplifier output signal from the filter and amplifier circuit 310 is greater than the predetermined upper voltage threshold (block 245, yes), the controller 306 assumes that the transponder 102 is positioned in a hole and the process proceeds in a loop (250-455-240-245) to reduce the amplitude of the shift and clamp circuit output signal. More specifically, the amount of shifting performed on the high voltage antenna signal by the shift and clamp circuit 308 in block 455 is increased by adjusting the amplitude of the shift current applied to the shift and clamp circuit 308.

As described above, this adjustment is initiated by the controller 306 which sends a digital control signal to the DAC 312. The DAC 312 generates and conveys an analog control signal to the current source 314 in response thereto causing the current source 314 to generate a shift current of an appropriate level. The shift current is applied to the shift and clamp circuit 308 to reduce the amplitude of the high voltage antenna signal before the signal reaches the filter and amplifier circuit 310. If the amplitude of the conditioned amplifier output signal is still greater than the predetermined upper voltage threshold after initial adjustment of the shift current, the process repeats the loop (blocks 240-455) to further reduce the amplitude of the high voltage antenna signal as the signal passes through the shift and clamp circuit 308. If the amplitude of the signal output by the filter and amplifier circuit 310 is less than the predetermined upper voltage threshold (block 245, no), the process returns to block 205 where the controller 116 attempts to read transponder data from a newly received transponder data signal.

While the forgoing preferred embodiments of the invention have been described and shown, it is understood that alternatives and modifications, such as those suggested and others, may be made thereto and fall within the scope of the invention.

I claim:

1. A reader for an RFID system comprising:
an antenna configured to receive a transponder data signal;
a receiver coupled to said antenna for generating a conditioned output signal from said transponder data signal; and
a controller coupled to said receiver for detecting amplitude of said conditioned output signal, determining a tag state based on said amplitude, and controlling operation of said receiver as a function of said tag state, wherein said antenna signal has a voltage value exceeding an upper voltage tolerance level of an amplifier and a high voltage reduction circuit conveys peak portions of said antenna signal to said amplifier for reducing said voltage value below said upper voltage tolerance level of said amplifier.

2. The reader of claim 1, wherein when said controller detects said amplitude of said conditioned output signal greater than a predetermined threshold such that transponder data is not extractable from said conditioned output signal, said controller selectively reduces said amplitude of said conditioned output signal by adjusting voltage reduction performed by said high voltage reduction circuit.

3. The reader of claim 1, wherein when said controller detects said amplitude of said conditioned output signal greater than a predetermined threshold such that transponder data is not extractable from said conditioned output signal, said controller selectively reduces said amplitude of said conditioned output signal by adjusting a the gain of said amplifier.

4. The reader of claim 1, wherein said controller includes an input circuit coupled to said amplifier, wherein said input circuit detects said amplitude of said conditioned output signal.

5. A reader for an RFID system comprising:
an antenna to receive a transponder data signal;
a receiver coupled to said antenna, said receiver including a voltage reduction circuit for receiving an antenna signal including said transponder data signal from said antenna and generating a voltage reduced signal, said receiver further including an amplifier coupled to said voltage reduction circuit for receiving said voltage reduced signal and generating a conditioned amplifier output signal; and
a controller coupled to said amplifier for demodulating said conditioned amplifier output signal, thereby reading said transponder data signal, wherein said controller detects an-amplitude of said conditioned amplifier output signal, determines a tag state based on said amplitude, and adjusts at least one of (i) a gain of said amplifier and (ii) amplitude of said voltage reduced signal as a function of said tag state.

6. The reader of claim 5, wherein said voltage reduction circuit is a shift and clamp circuit for isolating a portion of said antenna signal.

7. The reader of claim 6, wherein said controller controls amplitude of a shift current applied to said shift and clamp circuit.

8. The reader of claim 5 further comprising an automatic gain control circuit coupled to said amplifier for adjusting said gain of said amplifier as a function of said amplitude.

9. The reader of claim 5 further comprising an automatic gain control circuit coupled to said voltage reduction circuit for adjusting said amplitude of said voltage reduced signal as a function of said amplitude of said conditioned amplifier output signal.

10. The reader of claim 5, wherein when said controller detects said amplitude of said conditioned output signal greater than a predetermined threshold such that transponder data is not extractable from said conditioned output signal, said controller selectively reduces said gain of said amplifier.

11. The reader of claim 5, wherein when said controller detects said amplitude of said conditioned output signal greater than a predetermined threshold such that transponder data is not extractable from said conditioned output signal, said controller selectively reduces said amplitude of voltage reduced signal by adjusting an amount of voltage reduction performed by said voltage reduction circuit.

* * * * *